United States Patent
Fan et al.

(10) Patent No.: US 8,738,012 B2
(45) Date of Patent: May 27, 2014

(54) METHOD AND FEMTOCELL BASE STATION FOR SUPPORTING WIRELESS CONNECTIVITY OF A MOBILE STATION TO A CELLULAR NETWORK

(75) Inventors: Linghang Fan, Surrey (GB); Hassan Al-Kanani, Berkshire (GB); Nader Zein, London (GB)

(73) Assignee: NEC Europe Ltd., Heidelberg (DE)

( * ) Notice: Subject to any disclaimer, the term of this patent is extended or adjusted under 35 U.S.C. 154(b) by 0 days.

(21) Appl. No.: 13/582,492

(22) PCT Filed: Mar. 4, 2011

(86) PCT No.: PCT/EP2011/001091
§ 371 (c)(1),
(2), (4) Date: Sep. 4, 2012

(87) PCT Pub. No.: WO2011/107292
PCT Pub. Date: Sep. 9, 2011

(65) Prior Publication Data
US 2012/0322437 A1    Dec. 20, 2012

(30) Foreign Application Priority Data
Mar. 4, 2010   (EP) .................................... 10250411

(51) Int. Cl.
*H04W 36/00*      (2009.01)
(52) U.S. Cl.
USPC .......................... 455/444; 455/422.1; 455/501
(58) Field of Classification Search
USPC ............... 455/422.1, 423, 434, 436–444, 501
See application file for complete search history.

(56) References Cited

U.S. PATENT DOCUMENTS

| 2009/0061873 A1* | 3/2009  | Bao et al. ..................... 455/436 |
| 2010/0323711 A1* | 12/2010 | Damnjanovic et al. ........ 455/450 |
| 2011/0086641 A1* | 4/2011  | Guvenc et al. ................ 455/437 |
| 2011/0158168 A1* | 6/2011  | Chen et al. .................... 370/328 |
| 2012/0028645 A1* | 2/2012  | Kim et al. ..................... 455/444 |

FOREIGN PATENT DOCUMENTS

WO   2011059267 A2   5/2011

OTHER PUBLICATIONS

Picochip Designs: "Optimization of HeNB DL Power Setting". 3GPP Draft; R4-093669 Downlink HENB ENB Power Optimisation. 3rd Generation Partnership Project (3GPP). Mobile Competence Centre ; 650, Route Des Lucioles; F-06921 Sophia-Antipolis Cedex; France. Oct. 12, 2009. XP050393280.

(Continued)

*Primary Examiner* — Magdi Elhag
(74) *Attorney, Agent, or Firm* — Young & Thompson

(57) ABSTRACT

A method for supporting wireless connectivity of a mobile station to a cellular network, wherein the mobile station is located within the coverage area of a femtocell base station of which it is a non-CSG mobile station, and wherein the mobile station experiences interference which it indicates to the femtocell base station, is characterized in that the femtocell base station, upon receiving the experienced interference indication from the non-CSG mobile station, triggers the non-CSG mobile station to report interference related information, wherein, based on the interference related information, the femtocell base station performs a first check whether it is originator of the interference experienced by the non-CSG mobile station. Furthermore, a corresponding femtocell base station for supporting wireless connectivity of a mobile station to a cellular network is disclosed.

15 Claims, 2 Drawing Sheets

(56) References Cited

OTHER PUBLICATIONS

LAN/MAN Standards Committee of the IEEE Computer Society: "Part 16: Air Interface for Fixed and Mobile Broadband Wireless Access Systems", Draft Amendment to IEEE Standard for Local and metropolitan area networks, vol. IEEE P802.16m, No. D4 Feb. 3, 2010, pp. 700-705, XP002634307, New York, USA.

Kim R. Y. et al: "WiMAX femtocell: requirements, challenges, and solutions", IEEE Communications Magazine, IEEE Service Center, Piscataway, US, vol. 47, No. 9, Sep. 1, 2009, pp. 84-91, XP011283369.

International Search Report dated May 17, 2011, in corresponding PCT application.

Fan et al., "Proposed text related to procedure Procedure for non-CSG members connecting to a CSG Femtocell ABS in IEEE 802.16m/D4 (16.4.11)", IEEE 802.16 Broadband Wireless Access Working Group, Mar. 5, 2010, IEEE C802.16m-10-_0038, URL; http://www.ieee802.org/16/tgm/contrib/C80216m-10_0038.doc.

Lee et al., "Interference Mitigation in Femto ABS (16.4.11)", IEEE 802.16 Broadband Wireless Access Working Group, Dec. 24, 2009, IEEE C802.16m-09/2915, URL; http://www.ieee802.org/16/tgm/contrib/C80216m-09_2915.doc.

Li et al., "Interference mitigation to support overlaid CSG-closed femtoABS", IEEE 802.16 Broadband Wireless Access Working Group, Nov. 18, 2009, IEEE C80216m-09_2596r2, URL; http://www.ieee802.org/16/tgm/contrib/C80216m-09_2596r2.pdf.

\* cited by examiner

METHOD AND FEMTOCELL BASE STATION FOR SUPPORTING WIRELESS CONNECTIVITY OF A MOBILE STATION TO A CELLULAR NETWORK

BACKGROUND OF THE INVENTION

1. Field of the Invention

The present invention relates to a method for supporting wireless connectivity of a mobile station to a cellular network, wherein said mobile station is located within the coverage area of a femtocell base station of which it is a non-CSG mobile station, and wherein said mobile station experiences interference which it indicates to said femtocell base station.

Furthermore, the present invention relates to a femtocell base station for supporting wireless connectivity of mobile stations to a cellular network, being configured to receive interference indications experienced by non-CSG mobile stations that are located within its coverage area.

2. Description of the Related Art

In recent years there is an interest from mobile network operators to deploy femtocells (also known as home base stations, home BTS, home NBs, femto access points (FAPs), or femto radio base stations) which can be installed within the homes of the operators' customers. Such femtocells, currently being developed and standardized for both 3G and 4G networks, are scaled-down low-cost mobile base stations (BS) with low transmit power. Installation of femtocell base stations will typically be handled by the customers themselves without any technical training, therefore it has to be a simple plug-and-play procedure. Femtocell base stations are similar to a WiFi Access Point, but the radio interface is based on wide area cellular network standards such as WiMAX (Worldwide Interoperability for Microwave Access), UMTS (Universal Mobile Telecommunications System) or 3GPP LTE (Long Term Evolution). Generally, femtocell base stations are connected to the operators' network via a virtual private network connection over a normal broadband internet connection—backhaul connection—like DSL or FTTH (Fiber to the home).

One reason for the introduction of femtocells is the increase of operator network coverage and throughput for the sake of a better user experience and therewith to make a big step towards fixed-mobile-convergence. Like Wi-Fi access points, femtocells are designed to be deployed in home and office environments in order to give full coverage in the respective area and deployment of high density is expected in areas with high population or office density. However, the deployment of femtocells comes along with drawbacks of which one is interference effects between macro and femto levels of the network. Since femtocell base stations are often deployed in the same licensed spectrum as the wide area network of the operator, it is important to configure the radio interface correctly to avoid interference with other base stations.

Femtocell networks can improve indoor coverage and capacity. However, a femtocell base station needs to carefully balance its transmit power, which should be high enough to ensure good signal strengths for its subscribers, but not too high to avoid severe interference to other mobile stations, other femtocells and possible co-located macrocell base stations. To address this problem, according to prior art solutions, femtocells are linked for example to the network's Radio Resource Management (RRM), which is a functional/logical unit that is typically located in the Radio Access Network and that is responsible e.g. for frequency allocation and controlling the transmit power.

According to the definition in the current standard IEEE P802.16m, in terms of their subscription characteristics femtocell base stations are categorized into three main categories of subscriber types. The main categories are Open Subscriber Group (OSG), Closed Subscriber Group—Closed (CSG-Closed) and Closed Subscriber Group—Open (CSG-Open). These categories can be described as follows:

An Open Subscriber Group (OSG) femtocell base station is accessible to any mobile station (MS).

In CSG-Closed, the femtocell base station is accessible only to mobile stations which are members of this femtocell base station except for emergency services.

A CSG-Open femtocell base station is primarily accessible to the mobile stations that belong to its Closed Subscriber Group (CSG), while other mobile stations outside the CSG—i.e. non-member mobile stations—may also access such femtocell base station, but the non-member mobile stations will be served at lower priority. The CSG-Open femtocell base station will only provide service to non-member mobile stations as long as the Quality of Service (QoS) of mobile stations in its CSG is not compromised. That means best-effort services for non-CSG mobile stations of this femtocell base station.

Generally, the owner of the backhaul connection and/or the femtocell base station may want to restrict access to the femtocell base station because he pays the expense of maintenance and the broadband connection to his premises. Thus, the categorization according to the standard IEEE P802.16m causes the problem that when an MS, not being a member of the nearby CSG-Closed femtocells, enters an area which is covered only by one or more CSG-Closed femtocell base stations, the communication of the MS with its macrocell base station may be severely interfered or even totally interrupted. Specifically, for example if a Non-CSG member MS, which is not a member of the one or more nearby CSG-Closed femtocells, enters a CSG-Closed only area or is switched on in a CSG-Closed only coverage area, the interference from the surrounding femtocell base stations may interrupt the communication between the Non-CSG member MS and its serving (macro) base station or the nearest (macro) base station.

To solve the above problem, it has already been agreed within the current IEEE 802.16m standard to the following:

"If an advanced mobile station (AMS) is placed into outage by a CSG-closed Femto advanced base station (ABS) of which it is not a member, it can indicate this problem to that Femto ABS by sending an AAI_RNG-REQ with the "Femto Interference" bit set to 1."

This would allow the non-CSG-closed MS to inform the femtocell base station as being the source of the interference to the MS.

Based on this, several solutions are proposed to mitigate the interference. The most popular solutions are as follow:

Upon communication with the network entity, i.e. upon sending the interference indication to the femtocell, the CSG-Closed Femto BS may convert to a CSG-Open Femto BS. Alternatively, it has been proposed that the CSG-Closed Femto BS reduces its transmit power as directed by the network entity and/or that the CSG-Closed Femto BS refrains from transmitting on certain resource regions as indicated by the network entity.

However, all of these proposals are incomplete solutions, and typical questions such as the following still remain to be addressed:

1. How can the CSG-femtocell trust the MS, which sent the AAI_RNG-REQ, to be a legal MS?

2. How can the CSG-femtocell be convinced that it is the source of interference if there are other surrounding Base Stations around?
3. What is the interference level?

BRIEF SUMMARY OF THE INVENTION

It is therefore an object of the present invention to improve and further develop a method and a femtocell base station of the initially described type for supporting wireless connectivity of a mobile station to a cellular network in such a way that, by employing mechanisms that are readily to implement, interference of non-CSG mobile stations in the coverage area of CSG-Closed femtocell base stations is significantly reduced.

In accordance with the invention the aforementioned object is accomplished by a method characterized in that said femtocell base station, upon receiving the experienced interference indication from said non-CSG mobile station, triggers said non-CSG mobile station to report interference related information, wherein, based on said interference related information, said femtocell base station performs a first check whether it is originator of the interference experienced by said non-CSG mobile station.

Furthermore, the aforementioned object is accomplished by a femtocell base station characterized in that said femtocell base station is configured, upon receiving an experienced interference indication from a non-CSG mobile station, to trigger said non-CSG mobile station to report interference related information, wherein, based on said interference related information, said femtocell base station is configured to perform a first check whether it is originator of the interference experienced by said non-CSG mobile station.

According to the present invention it has been recognized that—in view of the incompleteness of the existing solutions—a complete solution to the problem inflected on non-CSG members by interference from the nearby CSG femtocell base station is one the biggest challenges facing femtocell implementation and as such a viable solution is very essential for the practical field deployment. Consequently, after the femtocell receives an experienced interference indication from a mobile station, the present invention proposes a follow-up procedure which effectively supports interference mitigation.

More specifically, the follow-up procedure includes a trigger for a non-CSG mobile that experiences interference from a nearby femtocell base station to report interference related information to the femtocell base station. In accordance with the present invention the femtocell base station that receives the report reacts actively by analyzing the interference related information and by performing a check whether it is originator of the interference experienced by the non-CSG mobile station. The outcome of this check may serve the femtocell base station as a basis for dedicated measures that can be carried out by the femtocell base station to react actively to the specific situation and to effectively reduce interference.

The method according to the present invention is reliable and easy to be implemented. Furthermore, it will not cause substantial modifications on the existing standards.

According to a preferred embodiment, on the basis of the outcome of the first check whether the femtocell base station is the originator of the interference experienced by the non-CSG mobile station, the femtocell base station may perform further steps directed to interference mitigation. For instance, in case the first check does not yield the femtocell base station as originator of the interference experienced by the non-CSG mobile station, the femtocell base station may abort a network entry procedure of the non-CSG mobile station.

However, in case the first check does yield the femtocell base station as originator of the interference experienced by the non-CSG mobile station, it may be provided that the femtocell base station further carries on the network entry procedure of the non-CSG mobile station in order to support the mobile station's connectivity to the network. Implementing such behavior of femtocell base stations would result in that each femtocell base station is responsible for those mobile stations it is interfering with. Interference is then mitigated by supporting network entry of mobile stations via the respective femtocell base station.

According to a preferred embodiment it may be provided that the network entry procedure is only carried on in case the respective non-CSG mobile station has proven to be a legal user. To this end an authentication procedure may be performed between the femtocell base station and the non-CSG mobile station, wherein the network entry procedure of the non-CSG mobile station is further carried on only after successful completion of the authentication.

With respect to a still further reduction of interference, it may be provided that the femtocell base station, in case it confirms itself as originator of the interference experienced by the non-CSG mobile station in the first check, performs a second check whether it can mitigate the interference by itself. In the context of this second check the femtocell base station may initiate various measures such as beamforming, power control, spectrum avoidance, etc., and may check how these measures influence the interference experienced by the non-CSG mobile station. For the uplink transmission, the exchanged information may be used by the femtocell base station to cancel or at least reduce interference from non-member mobile stations.

Advantageously, in case the second check yields that the interference problem with the non-CSG mobile station can be solved, the femtocell base station may perform the appropriate interference mitigation measures. On the other hand, in case the second check yields that the interference problem with the non-CSG mobile station can not be solved, the femtocell base station may contact other base station to co-operate on interference mitigation measures. Different solutions can be applied in this context depending on the specific scenarios.

It may be provided that the mobile station may indicate experienced interference indication to the femtocell base station by way of sending either a message specifically designed for this purpose or an already existing message. For instance, in a specific embodiment the mobile station sends an Advanced Air Interference Ranging Request (AAI_RNG-REQ) message, which has been already implemented in the respective standards. In this message a "Femto Interference" bit is specified which can be set to 1 in case of interference.

In a similar way the Advanced Air Interference Scanning Interval Allocation Response (AAI_SNC-RSP) message implemented in the respective standards may be employed. In particular, this message may be sent from the femtocell base station to the non-CSG mobile station and may be used by the non-CSG mobile station as a trigger to report interference related information to the femtocell base station. In response, the non-CSG mobile station may employ an Advanced Air Interference Scanning Result Report (AAI_SNC-REP) message as implemented in the respective standards for reporting interference related information to the femtocell base station. By employing existing standard messages, the implementation of the method according to the present invention does not require any substantial modifications of the standards.

In order to provide the femtocell base station a comprehensive overview of the interference conditions experienced by the non-CSG mobile station, it may be provided that the interference related information includes the identity of the interfering base station. Alternatively or additionally, the interference related information may include information about the strength of the experienced interference, for instance in form of indicating an interference level.

Although the present invention can be applied in various scenarios, it proves to be particularly suitable for WiMAX and/or any future wireless broadband technologies.

BRIEF DESCRIPTION OF THE DRAWINGS

There are several ways how to design and further develop the teaching of the present invention in an advantageous way. To this end it is to be referred to the patent claims and to the following explanation of preferred embodiments of the invention by way of example, illustrated by the FIGURE on the other hand. In connection with the explanation of the preferred embodiments of the invention by the aid of the FIGURE, generally preferred embodiments and further developments of the teaching will be explained. In the drawings FIG. 1a/b is a flow diagram illustrating a mechanism to allow non-CSG members to access a CSG femtocell base station according to an embodiment of the present invention.

DETAILED DESCRIPTION OF THE PREFERRED EMBODIMENTS

Figure 1A:
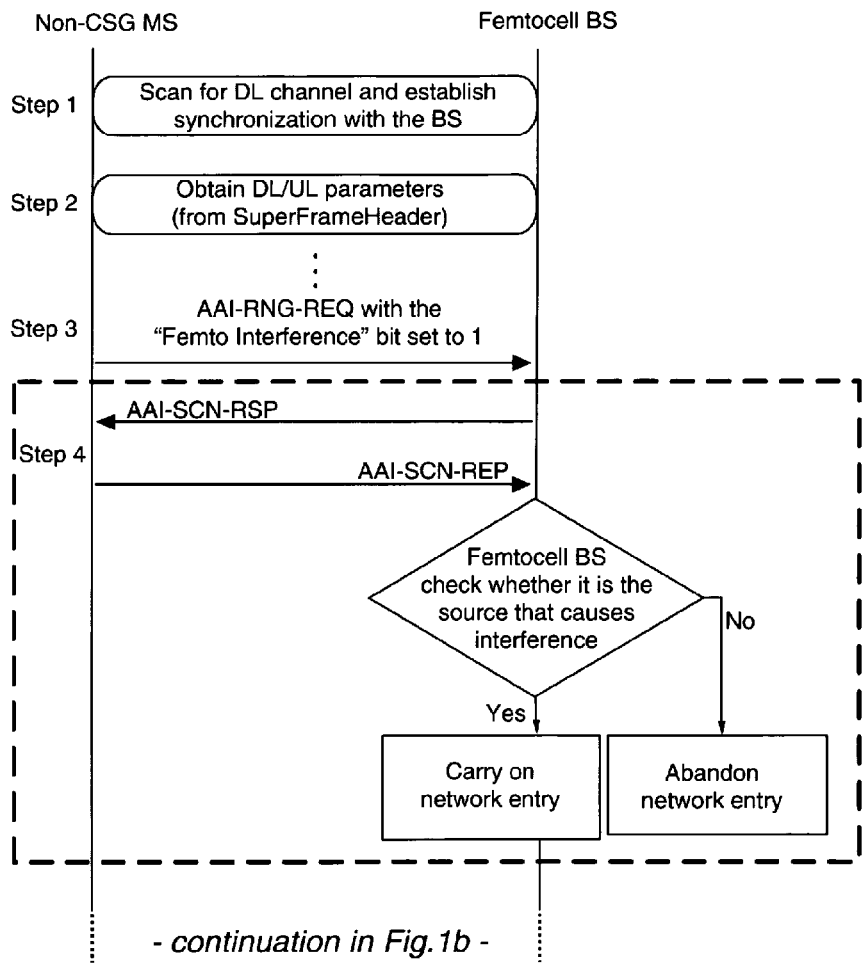
Figure 1B:
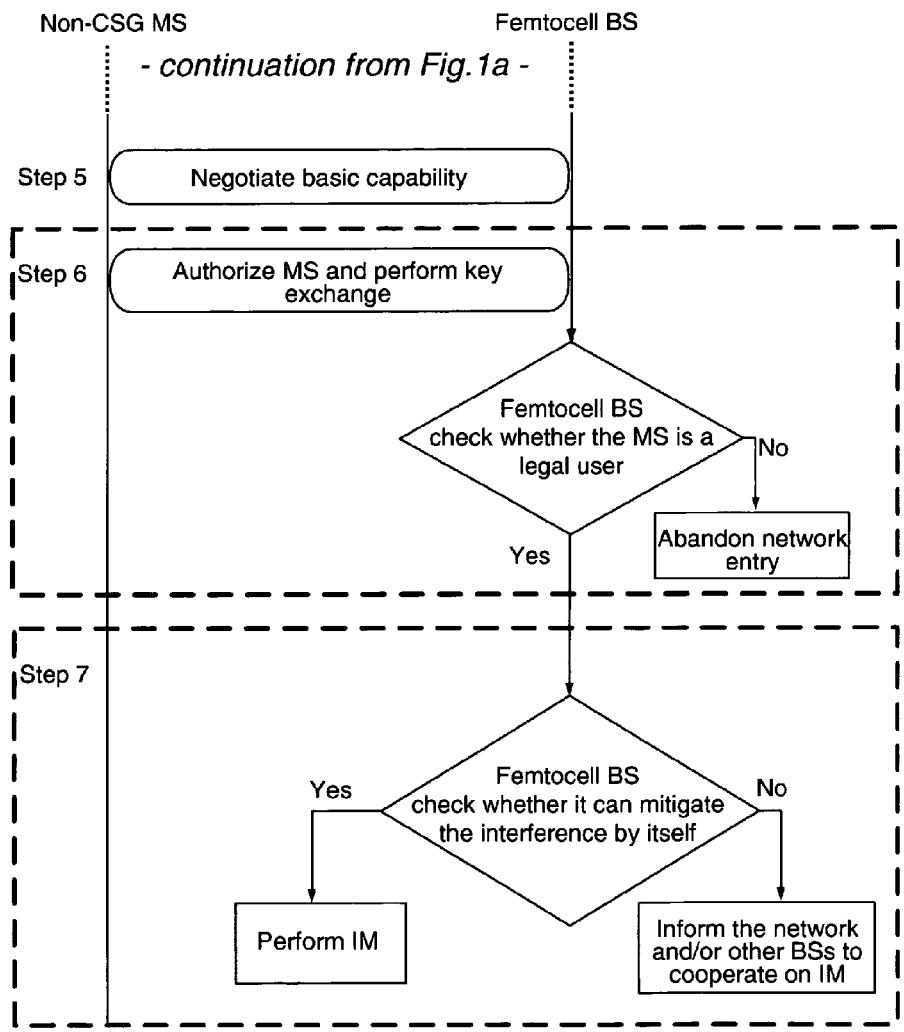

FIG. 1a/b is a schematic illustration of a method according to an embodiment of the present invention, which shows a network entry procedure that allows non-CSG members to access a CSG femtocell base station. FIG. 1a illustrates the first part of a multi-tier interference mitigation procedure in femtocell deployment, which comprises steps 1-4, whereas FIG. 1b illustrates the second part of the procedure including steps 5-7. As indicated by that dashed line boxes, steps 4, 6 and 7 include essential steps according to embodiments of the present invention, which are novel compared to prior art solutions.

As shown in FIG. 1a, the method and procedure for non-CSG members connecting to a CSG femtocell base station starts with step 1, according to which a non-CSG mobile station MS, when it is severely interfered by the nearby femtocell base station BS, will scan for the downlink channels and synchronise with the femtocell BS. By specifically adding a scanning procedure the femtocell BS can confirm whether it is the source that causes the interference, as will be described in detail hereinafter.

After synchronization, in step 2 the non-CSG MS can then obtain the uplink (UL)/downlink (DL) parameters from the superframe header (SFH).

Following this, in step 3 the non-CSG MS can indicate its experienced interference problem to the femtocell BS, e.g. by sending an AAI_RNG-REQ message with the "Femto Interference" bit set to 1.

After having received the AAI_RNG-REQ message, in step 4 the femtocell BS can send the non-CSG MS an AAI_SCN-RSP, which functions as a trigger for the non-CSG and MS to report on the experienced interference in more detail. As a result, the non-CSG MS will report the measurement results to the femtocell BS, e.g. by employing an AAI_SCN-REP message, in which the identity of the interfering base station and the interference level are included.

Upon receiving the report from the non-CSG MS, the femtocell BS performs a first check whether it is the source that causes interference. In case the femtocell BS confirms itself as the source that causes the interference, it will carry on the network entry procedure of the non-CSG MS. Otherwise, at this stage of the procedure the femtocell BS will abandon the non-CSG MS's network entry.

In case the network entry procedure of the non-CSG MS is carried on, the basic capability negotiation between the non-CSG MS and the femtocell BS may be performed, as indicated in step 5 of FIG. 1b.

In step 6 the phase of authentication procedure is initiated, since only after a successful authentication procedure, the non-CSG MS can be proven to be a legal user. If the non-CSG MS is proven to be a legal user, the network entry will carry on. Otherwise, the non-CSG MS's network entry will be terminated. Although this step is a standard part of the network entry, in prior art it has not been considered so far in connection with femtocell interference mitigation.

Step 7 proposes a two-tier interference mitigation scenario. After the successful completion of the authentication procedure, the femtocell BS will firstly check whether it can mitigate the interference by itself. To this end the femtocell BS performs a second check and initiates the necessary measures, such as beamforming, power control, spectrum avoidance, and so on. For the uplink transmission, the exchanged information may be used by the femtocell BS to cancel the interference from non-member MSs.

In case the outcome of the second check indicates to the femtocell BS that it can solve the interference problem by itself, the femtocell BS will perform the appropriate interference mitigation procedures, e.g. it will reduce its transmit power. On the other hand, if the outcome of the second check indicates to the femtocell BS that it can not sort out the interference problem by itself, it will contact other BSs to co-operate on the process of mitigating the interference. Different solutions can be applied depending on the specific scenarios. For instance, the femtocell BS would coordinate interference mitigation and exchange information with other BSs, either through direct air link or network backhaul connection to request the other neighbour BSs to adjust their downlink TX power, or to request their MS to reduce its UL power, or to co-ordinately manage radio resource to minimise inter-cell interference, in which the femtocell BS and other BSs can negotiate to use different radio frequencies, or the femtocell BS and the other BSs can perform co-ordinated beamforming to reduce the interference, or change allocated resources for the interfering MS, or start network initiated handover procedure. Other advanced techniques such as interference randomisation could also be utilised.

In contrast to this two-tier interference mitigation solution, which tries to perform the interference mitigation at the femtocell BS first, and will contact other BSs only if it cannot perform the interference mitigation independently, existing state-of-art solutions are focused on either the femtocell BS or the network, but do not provide a two-tier solution. However, by implementing a two-tier solution as described above, the impact on the system can be significantly minimized.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting wireless connectivity of a mobile station to a cellular network, the method comprising:
receiving an experienced interference indication from the mobile station, at a femtocell base station, that the mobile station experiences interference, the said mobile station being located within a coverage area of the femtocell base station and being a non-Closed Subscriber Group (CSG) mobile station of the femtocell base station;
triggering, by the femtocell base station, the non-CSG mobile station to report interference related information upon receiving the experienced interference indication from the non-CSG mobile station;
performing a first check as to whether it the femtocell base station is an originator of the interference experienced by the non-CSG mobile station, based on the interference related information; and
aborting, by the femtocell base station, a network entry procedure of the non-CSG mobile station when the first check does not indicate the femtocell base station as the originator of the interference experienced by the non-CSG mobile station.

2. The method according to claim 1, wherein said femtocell base station carries on a network entry procedure of said non-CSG mobile station when the first check yields said femtocell base station as the originator of the interference experienced by said non-CSG mobile station.

3. The method according to claim 2, wherein a network entry procedure of said non-CSG mobile station is further carried on only after successful authentication between said femtocell base station and said non-CSG mobile station.

4. The method according to claim 1, wherein said femtocell base station performs a second check as to whether the femtocell base station can mitigate the interference by itself when the first check yields the femtocell base station as the originator of the interference experienced by the non-CSG mobile station.

5. The method according to claim 4, wherein said second check includes beamforming, power control, and/or spectrum avoidance measures.

6. The method according to claim 4, wherein when the second check yields that the interference problem with said non-CSG mobile station can be solved, said femtocell base station performs appropriate interference mitigation measures.

7. The method according to claim 4, wherein when the second check yields that the interference problem with said non-CSG mobile station cannot be solved, said femtocell base station contacts other base station to cooperate on interference mitigation measures.

8. The method according to claim 1, wherein said mobile station performs the experienced interference indication by sending an Advanced Air Interference Ranging Request (AAI_RNG-REQ) message to said femtocell base station.

9. The method according to claim 1, wherein a trigger for said non-CSG mobile station to report interference related information includes an Advanced Air Interference Scanning Interval Allocation Response (AAI_SNC-RSP) message received from said femtocell base station.

10. The method according to claim 1, wherein said non-CSG mobile station employs an Advanced Air Interference Scanning Result Report (AAI_SNC-REP) message for reporting interference related information to said femtocell base station.

11. The method according to claim 1, wherein said interference related information includes an identity of an interfering base station.

12. The method according to claim 1, wherein said interference related information includes an interference level experienced by said non-CSG mobile station.

13. The method according to claim 1, wherein said cellular network is a WiMAX network.

14. The method according to claim 5, wherein when the second check yields that the interference problem with said non-CSG mobile station can be solved, said femtocell base station performs appropriate interference mitigation measures.

15. A femtocell base station for supporting wireless connectivity of mobile stations to a cellular network, the femtocell base station comprising:
one or more processors configured to receive experienced interference indications from one or more non-Closed Subscriber Group (CSG) mobile stations that are located within a coverage area of the femtocell base station,
to trigger said one or more non-CSG mobile stations to report interference related information upon receiving the experienced interference indications,
to perform a first check as to whether the femtocell base station is an originator of the interference experienced by said one or more non-CSG mobile stations, based on the interference related information, and to abort a network entry procedure of the one or more non-CSG mobile stations when the first check does not indicate the femtocell base station as the originator of the interference experienced by the one or more non-CSG mobile stations,
wherein the femtocell base station carries on a network entry procedure of the one or more non-CSG mobile stations when the first check yields the femtocell base station as the originator of the interference experienced by the one or more non-CSG mobile stations.

* * * * *